United States Patent
Louis

(10) Patent No.: US 12,552,899 B2
(45) Date of Patent: Feb. 17, 2026

(54) POLYARYLETHER KETONE POLYMERS

(71) Applicant: SYENSQO SPECIALTY POLYMERS USA, LLC, Alpharetta, GA (US)

(72) Inventor: Chantal Louis, Alpharetta, GA (US)

(73) Assignee: Syensqo Specialty Polymers USA, LLC, GA (US)

( * ) Notice: Subject to any disclaimer, the term of this patent is extended or adjusted under 35 U.S.C. 154(b) by 581 days.

(21) Appl. No.: 17/995,666

(22) PCT Filed: Apr. 2, 2021

(86) PCT No.: PCT/EP2021/058786
§ 371 (c)(1),
(2) Date: Oct. 6, 2022

(87) PCT Pub. No.: WO2021/204718
PCT Pub. Date: Oct. 14, 2021

(65) Prior Publication Data
US 2023/0102203 A1    Mar. 30, 2023

Related U.S. Application Data

(60) Provisional application No. 63/005,534, filed on Apr. 6, 2020.

(30) Foreign Application Priority Data

Jul. 2, 2020 (EP) .................................. 20183602

(51) Int. Cl.
*C08G 65/40* (2006.01)
*C08L 71/10* (2006.01)

(52) U.S. Cl.
CPC .......... *C08G 65/4012* (2013.01); *C08L 71/10* (2013.01); *C08G 2650/40* (2013.01)

(58) Field of Classification Search
CPC ............ C08G 65/4012; C08G 2650/40; C08G 65/40; C08L 71/10; C08L 71/12
See application file for complete search history.

(56) References Cited

U.S. PATENT DOCUMENTS 9,133,111 B2   9/2015  Louis et al.

FOREIGN PATENT DOCUMENTS

| | | |
|---|---|---|
| EP | 0225750 A2 | 6/1987 |
| EP | 1459882 A1 | 9/2004 |
| EP | 1559542 A1 | 8/2005 |
| JP | H01221426 A | 9/1989 |
| WO | 2011123790 A1 | 10/2011 |
| WO | 2016016643 A1 | 2/2016 |
| WO | 2016042492 A2 | 3/2016 |
| WO | 2018086873 A1 | 5/2018 |
| WO | 2019122143 A1 | 6/2019 |

OTHER PUBLICATIONS

English Machine Translation of JP H01221426 (Year: 1988).*
Murphy, J. "Additives for Plastics Handbook", 2nd Edition, 2001, Chapter 5.2.3., p. 43-48—Elsevier Advanced Technology (8 pages).
Ben-Haida, A. et al. "Synthesis of a Catechol-Based Poly(ether ether ketone) ("o-PEEK") by Classical Step-Growth Polymerization and by Entropically Driven Ring-Opening Polymerization of Macrocyclic Oligomers" Macromolecules, 2006, 39, 6467-6472 (6 pages).
International Search Report issued in International Application No. PCT/EP2021/058786 dated May 11, 2021 (4 pages).
Written Opinion issued in International Application No. PCT/EP2021/058786 dated May 11, 2021 (7 pages).

* cited by examiner

*Primary Examiner* — Randy P Gulakowski
*Assistant Examiner* — Holley Grace Hester
(74) *Attorney, Agent, or Firm* — Osha Bergman Watanabe & Burton LLP

(57) ABSTRACT

The present invention relates to novel polyaryl ether ketone copolymers, a method for their preparation, polymer compositions including the same and shaped articles manufactured from said polymer compositions.

20 Claims, No Drawings

POLYARYLETHER KETONE POLYMERS

This application is a national stage entry under 35 U.S.C. § 371 of International Application No. PCT/EP2021/058786 filed Apr. 2, 2021, which claims priority from provisional U.S. patent application No. 63/005,534 filed on Apr. 6, 2020 and from EP20183602.0 filed on Jul. 2, 2020. The entire contents of these applications are explicitly incorporated herein by this reference.

TECHNICAL FIELD

The present invention relates to novel polyaryl ether ketone polymers, a method for their preparation, polymer compositions including the same and shaped articles manufactured from said polymer compositions.

BACKGROUND ART

In the field of oil and gas exploration, automotive, aerospace, electronics, semi-conductor industry, industrial or consumer applications, polymers are requested showing a combination of high temperature performance, good chemical resistance, low smoke and flammability, good mechanical properties, good fatigue resistance, and the like. Among these, oil and gas exploration requires materials able to resist to high temperatures and pressures, and capable of maintaining the required performances upon prolonged exposure to extreme pressure and temperatures as well as to aggressive chemicals present in downhole environment, such as salt water, hydrocarbons, etc.

Poly(aryl ether ketone) polymers (PAEK) are high performance plastics with high thermal resistance, used for a number of industrial applications, where resistance to extreme conditions is required.

Among the others, poly(ether ether ketone) (PEEK) polymers having recurring unit of formula -Ph-O-Ph-C(=O)-Ph-O— (with -Ph- being a 1,4-phenylene group), has found broad utility for their high temperature performance and excellent chemical resistance. However, its glass transition temperature (Tg) of about 148° C. is somewhat limiting its ability to withstand continuous operations at temperature of or higher than 150° C.

To increase the glass transition temperature, polyaryl ether ketone (PAEK) polymers have been proposed, such as for example, PEK characterized by recurring units of formula —O-Ph-C(=O)-Ph-, PEKK characterized by recurring units of formula —O-Ph-C(=O)-Ph-C(=O)-Ph-, PEKEKK characterized by recurring units of formula —O-Ph-C(=O)-Ph-O-Ph-C(=O)-Ph-C(=O)-Ph-. These polymers while possessing increased Tg, are nevertheless known as more sensitive to chemicals in aggressive environments, e.g. they possess lower steam resistance and may suffer from high melting temperatures associated to processing hurdles. These polymers also tend to exhibit a moderate melt stability, which limits their processability.

With the aim of providing materials possessing Tg higher than PEEK but yet similar or even lower crystalline melting point, copolymers including PEEK and PEDEK recurring units have been proposed in the art. These copolymers comprise a mixture of units (I) —O-Ph-O-Ph-C(=O)-Ph- and (II) —O-Ph-Ph-O-Ph-C(=O)-Ph- (with -Ph- being a 1,4-phenylene unit) have been proposed, for example in EP 0225750 (ICI PLC), WO 2016/016643 (VICTREX MANUFACTURING LIMITED).

More recently, WO 2018/086873 (SOLVAY SPECIALTY POLYMERS U.S.A., LLC.) disclosed copolymers comprising recurring units (I) and (II) mentioned above in a molar ratio of 45:55 to 15:85 and having a narrow molecular weight distribution, useful for making parts included in devices used for oil and gas recovery.

As an alternative, copolymers comprising PEEK or PEDEK units and PEoEK units of formula —O— orthoPh-O-Ph-C(O)-Ph- (with -orthoPh- being a 1,2-phenylene unit; and -Ph- being a 1,4-phenylene unit) have been proposed in the art.

For instance, JPH1221426 (IDEMITSU KOSAN CO., LTD.) describes notably copolymers of PEEK or PEDEK and PEoEK in its examples 2, 5 and 6, manufactured from 4,4'-biphenol or hydroquinone, pyrocatechol and difluorobenzophenone, as allegedly possessing increased glass transition temperature, and simultaneously excellent heat resistance. The PEDEK-PEoEK copolymer disclosed in Example 2 contains PEDEK and PeoEK units in a 50:50 molar ratio.

SUMMARY OF INVENTION

The Applicant perceived that despite the efforts made in the art, there is still the need of providing PEDEK-PEoEK copolymers having a combination of physical and mechanical properties such that they can be used to manufacture devices for use in harsh conditions and environments, such as notably oil and gas, automotive, aerospace, electronics, semi-conductor industry, industrial or consumer applications.

More in particular, the Applicant faced the problem of providing a PEDEK-PEoEK copolymers, which compared to polymers known in the art, are characterized by a more rigid backbone structure and increased glass transition temperature (Tg), such that the copolymer of the invention have both improved mechanical properties and chemical resistance, which is a unique combination of properties desired for industrial applications, including notably oil and gas, automotive, aerospace, electronics, semi-conductor industry, industrial or consumer applications.

The Applicant surprisingly found that a PEDEK-PEoEK copolymer showing such desired properties can be synthetized by selecting the molar amounts of its PEDEK and PEoEK recurring units.

Thus, in a first aspect the present invention relates to a polymer [polymer (P)] comprising:
from more than 60 to 85 mol. % based on 100 mol. % of said polymer (P) of recurring units ($R_{PEDEK}$) of formula (I):

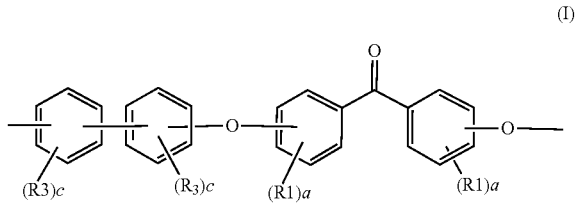

wherein
each R1 is independently selected from $C_1$-C12 alkyl group optionally comprising one or more heteroatom(s), sulfonic acid and sulfonate groups, phosphonic acid and phosphonate groups, amine and quaternary ammonium groups, each R3 is independently halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium each a and each c is independently 0 or an integer from 1 to 4;

recurring units ($R_{PEoEK}$) of formula (II):

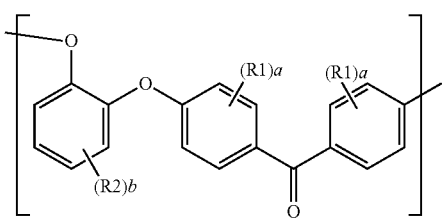

wherein each R1 and each a is defined above, each R2 is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, and each b is independently 0 or an integer from 1 to 4.

In a second aspect, the present invention relates to a method for the synthesis of said polymer (P), said method comprising:

(a) contacting at least one compound of formula (III)

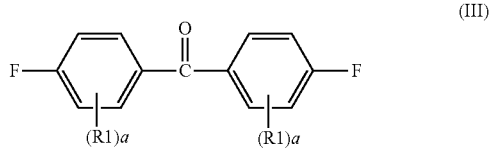

wherein each R1 and each a is as defined above, with a mixture of compounds of formula (IV) and (V):

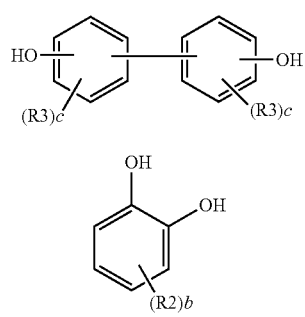

wherein each R2, each R3, each b and each c is as defined above, such that the ratio of (IV) and (V) is from 85/15 to 60/40;

in the presence of a base [base (B)] and in a polar organic solvent [solvent (S)], so as to obtain a reaction mixture;

(b) optionally, terminating the reaction in step (a) by contacting said reaction mixture with a suitable agent, so as to obtain a product mixture; and (c) recovering said polymer (P) from said reaction mixture or from said product mixture.

In a third aspect, the present invention relates to a composition [composition (C)] comprising the polymer (P) as described above and at least one additional ingredient [ingredient (in)].

In a further aspect, the present invention relates to a shaped article comprising the polymer (P) and/or the composition (C) according to the present invention.

More preferably, said shaped article is an article for oil and gas recovery, automotive, aerospace, electronics, semi-conductor industry, industrial or consumer applications.

In a further aspect, the present invention relates to a method of making parts included in devices used for oil & gas recovery, automotive, aerospace, electronics, semi-conductor industry, industrial or consumer applications, said method including moulding and/or extruding and/or or coating those parts from said polymer (P) and/or from said composition (C).

DESCRIPTION OF EMBODIMENTS

According to a preferred embodiment, polymer (P) as defined above comprises only said recurring units ($R_{PEDEK}$) of formula (I) as defined above and said recurring units ($R_{PEoEK}$) of formula (II) as defined above.

Preferably, polymer (P) comprises from 61 mol. %, more preferably from 62 mol. % and even more preferably 63 mol. % of said recurring units ($R_{PEDEK}$) of formula (I) as defined above, based on 100 mol. % of said polymer (P).

According to a preferred embodiment, said polymer (P) comprises from 64 mol. % of said recurring units ($R_{PEDEK}$) of formula (I), based on 100 mol. % of said polymer (P).

Preferred embodiments are those wherein said polymer (P) comprises from 65 mol. %, more preferably from 69 mol. % of said recurring units ($R_{PEDEK}$) of formula (I), based on 100 mol. % of said polymer (P).

Advantageously results have been obtained with polymer (P) comprising at least 70 mol. %, even more preferably at least 75 mol. % of said ($R_{PEDEK}$) of formula (I) as defined above.

Preferably, said polymer (P) comprises up to 85 mol. %, more preferably up to 84 mol. %, even more preferably up to 82 mol. % of said recurring units ($R_{PEDEK}$) of formula (I) as defined above, based on 100 mol. % of said polymer (P).

According to a preferred embodiment, said polymer (P) comprises up to 81 mol. % of said recurring units ($R_{PEDEK}$) of formula (I), based on 100 mol. % of said polymer (P).

Advantageously results have been obtained with polymer (P) comprising up to 80 mol. % of said ($R_{PEDEK}$) of formula (I) as defined above, based on 100 mol. % of said polymer (P).

Preferably, in said recurring units ($R_{PEDEK}$) of formula (I), a and c are 0.

Preferably, said polymer (P) comprises from 15 to 40 mol. % of said recurring units ($R_{PEoEK}$) of formula (II) as defined above, based on 100 mol. % of said polymer (P).

Preferably, said polymer (P) comprises up to 39 mol. %, more preferably up to 38 mol. % and even more preferably up to 37 mol. % of said recurring units ($R_{PEoEK}$) of formula (II), based on 100 mol. % of said polymer (P).

According to a preferred embodiment, said polymer (P) comprises up to 36 mol. % of said recurring units ($R_{PEoEK}$) of formula (II), based on 100 mol. % of said polymer (P).

Preferred embodiments are those wherein said polymer (P) comprises up to 35 mol. %, more preferably up to 31 mol. % of said recurring units ($R_{PEoEK}$) of formula (II) as defined above.

Advantageously results have been obtained with polymer (P) comprising up to 30 mol. %, even more preferably up to 25 mol. %, of said ($R_{PEoEK}$) of formula (II) as defined above.

Preferably, said polymer (P) comprises from 15 mol. %, more preferably from 16 mol. %, even more preferably from 18 mol. % of said recurring units ($R_{PEoEK}$) of formula (II) as defined above, based on 100 mol. % of said polymer (P).

According to a preferred embodiment, said polymer (P) comprises from 19 mol. % of said recurring units ($R_{PEoEK}$) of formula (II), based on 100 mol. % of said polymer (P).

Advantageously results have been obtained with polymer (P) comprising from 20 mol. % of said recurring units ($R_{PEoEK}$) of formula (II) as defined above.

Preferably, in said recurring units ($R_{PEoEK}$) of formula (II), each of a and b are 0.

According to another embodiment, polymer (P) of the present invention may additionally comprise recurring units ($R_{PAEK}$) different from said recurring units ($R_{PEDEK}$) and said recurring units ($R_{PEoEK}$).

In this embodiment, the amount of recurring units ($R_{PAEK}$) is preferably comprised between 0.1 and less than 50 mol. %, more preferably less than 25 mol. %, even more preferably less than 10 mol. % and still more preferably less than 2 mol. %, based on 100 mol. % of polymer (P).

Preferably, said recurring units ($R_{PAEK}$) comply with any of the following formulae:

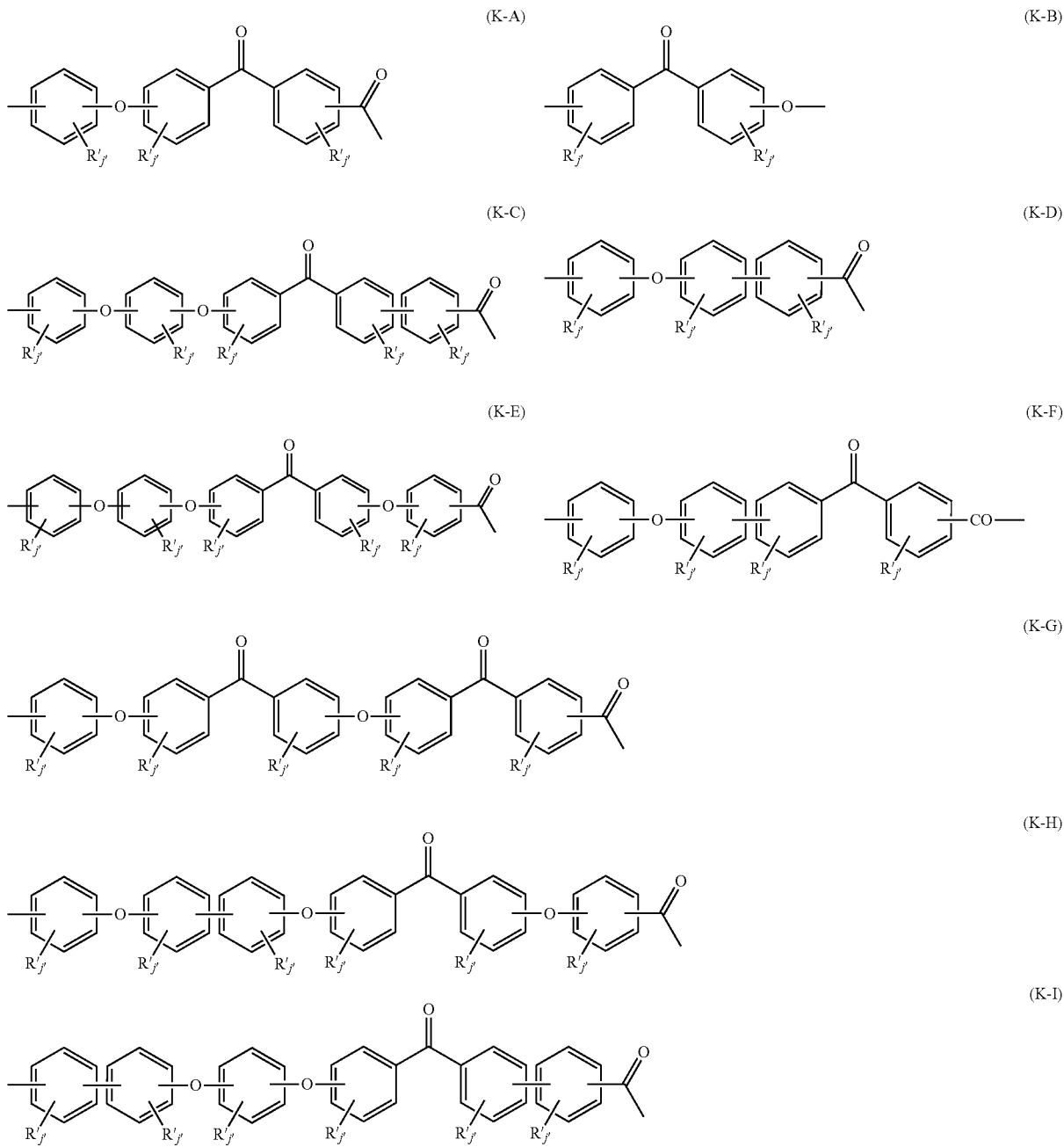

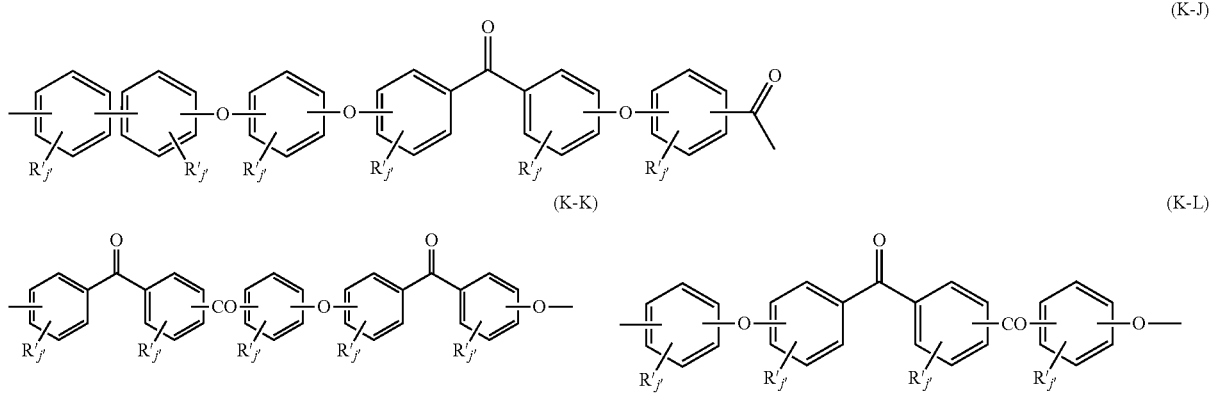

wherein in each of formulae (K-A) to (K-M) above, each of R', equal to or different from each other, is independently selected at each occurrence from a C1-012 group optionally comprising one or more than one heteroatoms, sulfonic acid and sulfonate groups, phosphonic acid and phosphonate groups, amine and quaternary ammonium groups; and each of j', equal to or different from each other, is independently selected at each occurrence from 0 and an integer of 1 to 4, preferably j' being equal to zero.

While embodiments of said polymer (P) comprising recurring units ($R_{PAEK}$) are encompassed by the present invention, it is nevertheless preferred that polymer (P) essentially consists of recurring units ($R_{PEDEK}$) and recurring units ($R_{PEoEK}$) as defined above.

Within the present description and in the following claims, the expression "essentially consist of recurring units ($R_{PEDEK}$) and recurring units ($R_{PEoEK}$)" is intended to indicate that any additional recurring unit(s) different from recurring units ($R_{PEDEK}$) and recurring units ($R_{PEoEK}$) as defined above may be present in polymer (P) in an amount of at most 1 mol. %, more preferably at most 0.5 mol. % relative to 100 mol. % of said polymer (P).

Defects, end groups and monomers' impurities may be incorporated in very minor amounts in polymer (P) of the present invention, so as to advantageously not affecting negatively the performances of the same.

Preferably, said recurring units ($R_{PEDEK}$) and said recurring units ($R_{PEoEK}$) are present in said polymer (P) in a molar ratio ($R_{PEDEK}$)/($R_{PEoEK}$) from 60/40 to 85/15, more preferably from 65/35 to 80/20.

Advantageously, polymer (P) according to the present invention is characterized by (i) a glass transition temperature (Tg) higher than 153° C. [measured at mid-point by DSC on the $2^{nd}$ heat scan up to 450° C., at 20° C./min heating and cooling rates according to ASTM D3418-03]; and (ii) a ratio of the storage modulus measured at 165° C. to the storage modulus measured at 140° C. higher than 15% [measured by dynamic mechanical analysis on a TA ARES G2 rheometer under torsion mode at 10 rad/s, 0.05% strain, raising the temperature from 30° C. to 330° C. at 5.0° C./min according to ADTM D5279-13].

In addition, polymer (P) is advantageously characterized by (iii) a heat of fusion (ΔH) higher than 40 J/g [determined as the area under the melting endotherm on the second heat scan in a differential scan calorimeter (DSC) measured according to ASTM D3418-03 up to 450° C. at a 20° C./min cooling and heat up rate]; and (iv) a melt viscosity in the range from 0.20 to 9.00 kN/m², preferably 0.30 to 5.00 kN/m², more preferably 0.40 to 4.50 kN/m² [measured at 410° C. and 46 s$^{-1}$ according to ASTM D3835].

Polymer (P) characterized by the above mentioned properties show better processability, notably in moulding or extrusion processing, compared to polymers already known in the art.

Preferably, in formula (III), a is 0 and said compound is 4,4'-difluorobenzophenone (DFBP).

Preferably, in formula (IV), c is 0 and said compound is 4,4'-dihydroxybiphenyl, otherwise known as 4,4'-biphenol.

Preferably, in formula (V), b is 0 and said compound is pyrocatechol (also known as catechol).

Preferably, step (a) is performed at a temperature of at least 130° C., preferably at least 140° C., more preferably at least 150° C., for about 0.5 to 15 hours.

It is also preferable that the compounds (III), (IV) and (V) are heated at a first temperature of at least 130° C., preferably at least 140° C., more preferably at least 150° C. before being contacted with the base (B).

Preferably, said base (B) is preferably selected from the group consisting of: potassium carbonate ($K_2CO_3$), potassium bicarbonate, sodium carbonate ($Na_2CO_3$), cesium carbonate ($Cs_2CO_3$), potassium phosphate and sodium bicarbonate.

Most preferably said base (B) is selected from the group consisting of: potassium carbonate ($K_2CO_3$), sodium carbonate ($Na_2CO_3$) or a mixture of both; even most preferably said base (B) is in a mixture of both.

Without being bound by any theory, the base acts to deprotonate the components (IV) and (V) during the condensation reaction.

Step (a) is conducted in a solvent (S) comprising diphenysulfone. In some embodiments, the solvent (S) comprises at least 50 wt. % of diphenylsulfone, based on the total weight of the solvent in the reaction mixture, for example at least 60 wt. %, at least 70 wt. %, at least 80 wt. %, at least 90 wt. %, at least 95 wt. % or at least 98 wt. %, based on the total weight of the solvent (S) in the reaction mixture.

In some embodiments, the solvent (S) consists essentially in diphenylsulfone.

In the method of the present invention, solvent (S) comprising limited amounts of impurities, as detailed in U.S. Pat. No. 9,133,111 is generally used.

Solvent (S) of the present invention may comprise benzophenone and/or dibenzothiophene dioxide.

Optionally, after step (a) and before said step (b) or said step (c), a step (a2) of raising the temperature is performed.

Preferably, said step (a2) comprises heating the reaction mixture obtained in step (a) to a temperature of at least 300° C., preferably at least 310° C., at an average temperature ramp rate of less than 5° C./minute, preferably less than 3° C./minute and/or at a temperature ramp rate of more than 0.1° C./minute.

Preferably, said step (a2) is performed for a time from 20 seconds to 3 hours, depending on the nature of the starting monomers and on the selected reaction conditions.

Preferably, step (b) is performed after step (a) or after step (a2), and before step (c).

According to this embodiment, step (b) is performed in a polar organic solvent as defined above in step (a).

Solvent (S) used in step (b) can be the same solvent used in step (a) or a solvent (S) different from the one used in step (a). Advantageously, the step (a) and step (b) are performed using the same solvent (S) as defined above.

Preferably, said step (b) is performed to terminate the polycondensation reaction in step (a). To this aim, suitable agents are selected from agents capable of terminating the chain growth, by being incorporated in the polymer backbone via a condensation reaction (also referred to as end-capping agents) and agents capable of terminating the chain growth without being incorporated in the polymer backbone through a condensation reaction (also referred to as terminating agents).

End-capping agents preferably comply with the following formula (F):

(F)

wherein
$R^6$ is F, Cl, or OH,
$R^7$ is —C(O)—Ar—$R^{10}$, —O—Ar—$R^{10}$, —$SO_2$—Ar—$R^{10}$, —Ar—$R^{10}$, an alkyl
(e.g. a $C_1$-$C_{10}$ alkyl or a $C_1$-$C_5$ alkyl) or —H, with Ar being an arylene group comprising at least one benzene ring (i.e. one benzene ring or several benzene rings), and with $R^{10}$ being F, Cl or H.

Preferably, $R^6$ is F or OH. More preferably, $R^6$ is F.
Preferably, $R^7$ is —C(O)—Ar—$R^{10}$, Ar—$R^{10}$ or H, with $R^{10}$ being F, Cl or H.

According to certain preferred embodiments, $R^{10}$ is F.
When $R^7$ is different from —H, $R^6$ and $R^7$ may be 1,2- or ortho-substitution on the phenylene cycle of formula (F) or they may be 1,3- or meta-substitution on the phenylene cycle.

Alternatively, $R^6$ and $R^7$ may preferably be 1,4- or para-substitution on the phenylene cycle of formula (F).

In some embodiments, the end-capping agent is selected from the group consisting of 4,4'-difluorobenzophenone, phenol, 4-phenoxyphenol, 4-phenylphenol, 4-fluorobenzophenone, 3-fluorobenzophenone, 2-fluorobenzophenone, 4,4'-dichlorodiphenylsulfone, 4,4'-difluorodiphenylsulfone and a mixture thereof.

Difluoro-compounds and monofunctional phenols are preferably used as end-capping agents. In some embodiments, the end-capping agent is an excess of a difluoro-compound monomer. The end-capping agent used in the method of the present invention is preferably 4,4'-difluorobenzophenone, phenol, 4-phenoxyphenol, 4-phenylphenol or a mixture thereof.

Example of compound suitable as terminating agents is lithium chloride.

Preferably, step (b) is performed using at least one end-capping agent and at least one terminating agent. More preferably, 4,4'-difluorobenzophenone and lithium chloride are used in step (b).

In general, the (poly)condensation reaction is carried out with a slight excess of difluoro-compound of formula (III).

It is further understood that, when used, the end-capping agent may be added to the reaction mixture at the inception of the polycondensation; as a whole, hence, considering that an excess of monomer (III) may be used as end-capping agent, as explained above, the molar ratio [(III)+(F)]/[(IV)+(V)] is ≥1.000, preferably ≥1.003, more preferably ≥1.006, even more preferably ≥1.010.

Preferably, step (b) comprises the following steps:
(b1) adding a first end capping agent in the reaction mixture;
(b2) adding a first terminating agent in the reaction mixture; and
(b3) optionally adding a second end capping agent and/or a second terminating agent in the reaction mixture, the second end capping agent and the second terminating agent being preferably identical to the first end capping agent and to the first terminating agent, respectively.

More preferably, said first end capping agent of step (b1) is 4,4'-difluorobenzophenone (DFBP).

More preferably, said terminating agent of step (b2) is lithium chloride (LiCl).

More preferably, said second end capping agent of step (b3) is 4,4'-difluorobenzophenone (DFBP) and said second terminating agent is lithium chloride (LiCl).

Preferably, the concentration of the monomers and end capping agents (when used) [(III)+(IV)+(V)+(F)] in the diphenylsulfone is at least 15 wt. %, preferably at least 20 wt. %, more preferably at least 23 wt. %.

Preferably, the concentration of the monomers and end capping agents (when used) [(III)+(IV)+(V)+(F)] in the diphenylsulfone is at most 45 wt. %, preferably at most 43 wt. %, more preferably at most 40 wt. %.

At the end of the reaction in step (a), eventually step (a2) and step (b), polymer (P) is obtained in the form of a solid phase.

Preferably, step (c) is performed to recover said polymer (P) by removing solvent (S) and the other organic compounds, such as for example sodium fluoride or potassium fluoride or the excess of base (B), by methods known in the art, such as washing, dissolving and filtering.

Before and, optionally, after said step (c), the polymer (P) recovered as solid phase can be advantageously subjected to a further step [step (d)] comprising at least one of comminution, pulverizing, triturating, so as to provide said polymer (P) in the form of small particles.

Preferably, said composition (C) comprises at least 10 wt. %, at least 20 wt. %, at least 30 wt. % of polymer (P), based on the total weight of the composition (C).

Preferably, composition (C) comprises at least 50 wt. %, more preferably at least 60 wt. %, at least 70 wt. %, at least 80 wt. %, at least 90 wt. %, still more preferably at least 95 wt. %, and even more preferably at least 99 wt. % of polymer (P), based on the total weight of composition (C).

Preferably, said at least one ingredient (in) is selected from the group consisting of (i) reinforcing fillers; (ii)

colorants, such as a dye; (iii) pigments, such as titanium dioxide, zinc sulfide and zinc oxide; (iv) light stabilizers, e.g. UV stabilizers; (v) heat stabilizers; (vi) antioxidants, such as organic phosphites and phosphonites; (vii) acid scavengers; (viii) processing aids; (ix) nucleating agents; (x) internal lubricants and/or external lubricants; (xi) flame retardants; (xii) smoke-suppressing agents; (xiii) anti-static agents; (xiv) anti-blocking agents; (xv) conductivity additives, such as carbon black and carbon nanofibrils; (xvi) plasticizers; (xvii) flow modifiers; (xviii) extenders; and (xix) metal deactivators.

Preferably, composition (C) includes less than 20%, preferably less than 10%, more preferably less than 5% and even more preferably less than 2% of at least one ingredient (in).

Preferred reinforcing fillers are selected from fibrous and particulate fillers, different from the pigments described below.

More preferably, said reinforcing filler is selected from mineral fillers (such as talc, mica, kaolin, calcium carbonate, calcium silicate, magnesium carbonate, boron nitride), glass fiber, carbon fibers, synthetic polymeric fiber, aramid fiber, aluminum fiber, titanium fiber, magnesium fiber, boron carbide fibers, boron nitride fibers, rock wool fiber, steel fiber, wollastonite, etc.

Nano-scale reinforcing fillers can also be used, such as those selected from: single and multi-wall carbon nanotubes, carbon nanofibers, graphene, graphene oxide, and nanoclays such as montmorillonite.

Still more preferably, said reinforcing filler is selected from mica, kaolin, calcium silicate, magnesium carbonate, glass fiber, carbon fibers and wollastonite.

More preferably, the filler is chosen from fibrous fillers. A particular class of fibrous fillers consists of whiskers, i.e. single crystal fibers made from various raw materials, such as $Al_2O_3$, SiC, BC, Fe and Ni.

In one preferred embodiment of the present invention the reinforcing filler is chosen from wollastonite and glass fiber.

Among fibrous fillers, glass fibers are preferred; they include chopped strand A-, E-, C-, D-, S-, T- and R-glass fibers, as described in chapter 5.2.3, p. 43-48 of Additives for Plastics Handbook, $2^{nd}$ edition, John Murphy.

Said glass fibers may have a circular cross-section or a non-circular cross-section (such as an oval or rectangular cross-section).

When the glass fibers used have a circular cross-section, they preferably have an average glass fiber diameter of 3 to 30 μm and particularly preferred of 5 to 12 μm. Different sorts of glass fibers with a circular cross-section are available on the market depending on the type of the glass they are made of. One may notably cite glass fibers made from E- or S-glass.

In some embodiments, the glass fiber is standard E-glass material with a non-circular cross section. In some aspects, the polymer composition includes S-glass fibers with a round cross-section.

In some embodiments, composition (C) includes at least one carbon fiber.

As used herein, the term "carbon fiber" is intended to include graphitized, partially graphitized, and ungraphitized carbon reinforcing fibers or a mixture thereof. The term "graphite fiber" is intended to denote carbon fibers obtained by high temperature pyrolysis (over 2000° C.) of carbon fibers, wherein the carbon atoms place in a way similar to the graphite structure.

The carbon fibers are preferably chosen from the group consisting of PAN-based carbon fibers, pitch based carbon fibers, graphite fibers, and mixtures thereof.

The fibers may be in the form of whiskers, short fibers, continuous fibers, sheets, plies, and combinations thereof. Continuous fibers may further adopt any of unidirectional, multi-dimensional, non-woven, woven, knitted, stitched, wound, and braided configurations, as well as swirl mat, felt mat, and chopped mat structures. The fiber tows may be held in position in such configurations by cross-tow stitches, weft-insertion knitting stitches, or a small amount of resin, such as a sizing. As used herein "continuous fibers" are fibers having a length greater than 10 mm.

When present, composition (C) preferably comprises less than 80 wt. %, more preferably less than 75 wt. %, even more preferably less than 70 wt. % of reinforcing filler, based on the total weight of composition (C).

When present, composition (C) preferably comprises at least 10 wt. %, preferably at least 20 wt. %, preferably at least 25%, most preferably at least 30 wt. % of reinforcing filler, based on the total weight of the composition (C).

Preferably, said composition (C) comprises at least one nucleating agent selected from talc or boron nitride.

Preferably, said polymer (P) is the only polymeric component in the polymer composition. As used herein, the expression "polymeric component" means a compound having repeat units and a molecular weight of at least 2,000 g/mol.

According to another embodiment, composition (C) comprises less than 3 wt. %, 2 wt. %, 1 wt. %, 0.5 wt. % of a polymeric component other than polymer (P).

Said polymeric component pother than polymer (P) is preferably at least one poly(aryl ether sulfone) (PAES) selected from the group consisting of a polysulfone (PSU), a polyphenylsulfone (PPSU), and a poly(ether sulfone) (PES).

Composition (C) can be prepared by a variety of methods involving intimate admixing of the components of the composition (C), for example by dry blending, suspension or slurry mixing, solution mixing, melt mixing, a combination of dry blending and melt mixing or fiber impregnation. As used herein, the "components of the polymer composition" includes the polymer (P) as above detailed, and at least one ingredient (in) as defined above.

Typically, the dry blending of the components of the polymer composition is carried out by using high intensity mixers, such as Henschel-type mixers, paddle mixers or ribbon mixers to obtain the polymer composition as a physical mixture.

Alternatively, the intimate admixing of the components of the polymer composition is carried out by tumble blending based on a single axis or multi-axis rotating mechanism to obtain a physical mixture.

Alternatively, the slurry mixing of the components of the polymer composition is carried out by slurrying the components of the polymer composition using an agitator in an appropriate liquid, such as, for example, methanol, followed by filtering the liquid away, to obtain a powder mixture of the components of the polymer composition.

In some embodiments, the method of making the polymer composition includes melt compounding the physical mixture. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

In some embodiments, the physical mixture is compounded in an extruder and then chopped into pellets or granules. The granules or pellets can then be further processed to manufacture additional shaped articles.

As mentioned above, shaped articles according to the present invention can be advantageously manufactured using polymer (P) alone or composition (C) as described above.

According to the first embodiment, said polymer (P) is processed into shaped articles as such, without the need of adding any filler or additional ingredient.

According to a second embodiment, said composition (C) is processed into shaped articles.

Said shaped article can include one or more parts. When the shaped article is a single part, the single part preferably consists of composition (C).

Alternatively, the shaped article may consist of more than one part, one or more of which preferably consists of polymer (P) or composition (C). When more than one part of the shaped article includes polymer (P) or composition (C), each part may include the same polymer (P) or composition (C) or a different polymer (P) or composition (C).

The weight of polymer (P) or composition (C), based on the total weight of shaped article, is preferably greater than 1%, greater than 5%, greater than 10%, preferably greater than 15%, greater than 20%, greater than 30%, greater than 40%, greater than 50%, greater than 60%, greater than 70%, greater than 80%, greater than 90%, greater than 95%, greater than 99%.

Polymer (P) or composition (C) are useful for the manufacture of articles useful in a wide variety of applications.

For example, the surprising and advantageous properties of the polymer (P) described herein makes the polymer (P) or composition (C) especially suitable for use in automotive applications such as magnet wire coatings in hybrid and electric vehicles, seal rings, bushings, bearings, thrust washers, oil and gas applications such as downhole cable coatings, in electrical and electronics applications such as test sockets for integrated circuit chips surface-mount (SMT) type components on circuit boards, lithium ion battery components including barriers between individual cells for short protection, film used in micro-speaker membrane components, aerospace applications such as electrical/electronic connectors for high temperature environments (e.g. near the engine), thermoplastic composite matrices for composite prepregs and laminates, injection moulded secondary structural parts, in semiconductor fabrication such as chemical mechanical planarization (CMP) rings, holders, carriers, cassettes and trays used at various stages of semiconductors and integrated circuit chips manufacturing and fabrication, in industrial applications such as compressor valve parts, which include the seat and the sealing element, oil and gas back up rings and seal rings and other sealing components for use in downhole applications, pump impellers and other fluid delivery components for use in chemical processing, coatings on steel or other metal components for corrosion protection, wire and cable insulation for electrical insulation and/or abrasion protection, in consumer applications such as housings or housing components of electronic nicotine delivery systems (ENDS), also known as e-cigarettes or vape pens.

In particular, composition (C) is well-suited for use as continuous fiber reinforced composite.

The shaped articles described herein can be manufactured from polymer (P) or composition (C) by injection molding, extrusion molding, compression molding, additive manufacturing (also called three-dimensional (3D) printing, for which the shaped articles may also be called 3D objects or 3D parts), continuous fiber impregnation, and continuous fiber composite lamination/consolidation or other shaping technologies.

In some embodiments, the method of making the shaped article or part thereof includes a step of compression molding or injection molding, and subsequent solidification of polymer (P) or composition (C).

In some embodiments, the method for making the shaped article or shaped article or part thereof includes a step of coating. For example, polymer (P) or composition (C) can be applied to a metal surface as a coating by any suitable coating method, preferably by electrostatic powder, waterborne suspension coatings or extrusion coating around a wire to form a coated wire, preferably a coated magnet wire.

According to the present invention, the shaped article may include a polymer-metal junction. The polymer-metal junction comprises polymer (P) or composition (C) comprising the same, as described above, in contact with a metal substrate.

The metal substrate can include any metallic composition including, but not limited to, aluminum, copper, gold, iron, nickel, platinum, silver, steel, and blends or alloys thereof (e.g., brass and bronze). The metal substrate is preferably copper, steel, aluminum, or a combination thereof.

In some embodiments, the metal substrate (e.g. an aluminum substrate) has a structured metal surface. "Structured metal surface" as used herein means a metal surface that has undergone any etching process to roughen the metal surface by removing at least part of the metal. Examples of structured metal surfaces include laser etched metal surfaces and chemically etched metal surfaces. In some embodiments, the metal surface is an un-etched metal surface.

In some aspects, the metal substrate is a nano-structured metal surface. "Nano-structured metal surface" means a metal surface that has been etched to have a nano-pitted surface with surface peaks and valleys having average depth, height and width dimensions in the nano-scale regime ranging from 10 to 1000 nm, preferably from 30 to 800 nm, and more preferably from 50 to 500 nm. In some embodiments, the metal substrate includes an NMT-treated metal surface. An "NMT-treated metal surface" means a nano-structured surface prepared by any etching/priming process described in EP1459882 B1, EP1559542 A1, or WO 2011123790 A1, the disclosures of which are incorporated herein by reference in their entireties.

In some embodiments, the metal substrate is a wire or cable. In alternative embodiments, the metal substrate is a part of a mobile electronic device.

In some embodiments, the polymer-metal junction includes a layer of the polymer composition having a thickness ranging from 0.025 mm to 3 mm.

The polymer-metal junction can be made by contacting the polymer (P) or the composition (C) as described herein, with the metal substrate, preferably a structured metal surface, more preferably a nano-structured metal surface, most preferably an NMT-treated metal surface. For example, the polymer (P) or the composition (C) may be deposited on or over-molded onto the metal substrate using any suitable melt-processing and deposition method.

In particular, the polymer-metal junction may be made by injection or compression molding, or coating polymer (P) or the composition (C), onto the metal substrate. The polymer-metal junction can also be formed by an electrostatic or solvent-borne powder coating process. In some aspects, the polymer-metal junction can be formed by an extrusion process for coating a wire or cable. In alternative embodiments the polymer-metal junction is made by an additive manufacturing process.

The polymer-metal junction of the invention may be well suited for the manufacture of articles useful in a wide variety of applications. For example, the properties of the polymer (P) described herein makes the polymer composition especially suitable for use in automotive applications such as magnet wire coatings in hybrid and electric vehicles, oil and gas applications such as downhole cable coatings, structural components for mobile electronic devices (e.g., framework or housing) including a metal part, electrostatic powder coatings on metal substrates for corrosion protection and abrasion resistance.

Additional exemplary embodiments are directed to methods of making polymer (P) composites comprising impregnating the reinforcing fibers described above with the polymer matrix described herein.

Various methods can be employed by which fibers may be impregnated with the polymer matrix, wherein the matrix is either in molten or particulate form, including, for example, powder coating, film lamination, extrusion, pultrusion, aqueous slurry, and melt impregnation, to form plies in the form of, for example, sheets or tapes of fibers that are at least partially impregnated with the polymer matrix. As used herein, "tape" means a strip of material with longitudinally extending reinforcement fibers that are aligned along a single axis of the strip material.

Plies of matrix impregnated fibers may be placed adjacent one another to form an unconsolidated composite laminate, such as a prepreg. The fiber reinforced layers of the laminate may be positioned with their respective fiber reinforcements in selected orientations relative to one another.

The plies may be stacked, manually or automatically, e.g., by automated tape layup using "pick and place" robotics, or advanced fiber placement wherein pre-impregnated tows of fibers are heated and compacted in a mold or on a mandrel, to form a composite laminate having desired physical dimensions and fiber orientations.

The layers of an unconsolidated laminate are typically not completely fused together and the unconsolidated composite laminate may exhibit a significant void content, e.g., greater than 20% by volume as measured by x-ray micro-tomography. Heat and/or pressure may be applied, or sonic vibration welding may be used, to stabilize the laminate and prevent the layers from moving relative to one another, e.g., to form a composite material "blank", as an intermediate step to allow handling of the composite laminate prior to consolidation of the composite laminate.

The composite laminate so formed is subsequently consolidated, typically by subjecting the composite laminate to heat and pressure, e.g., in a mold, to form a shaped fiber reinforced thermoplastic matrix composite article. As used herein, "consolidation" is a process by which the matrix material is softened, the layers of the composite laminate are pressed together, air, moisture, solvents, and other volatiles are pressed out of the laminate, and the adjacent plies of the composite laminate are fused together to form a solid, coherent article. Ideally, the consolidated composite article exhibits minimal, e.g., less than 5% by volume, more typically less than 2% by volume, void content as measured by x-ray microtomography.

The composite preferably comprises from 20 to 80 wt. % of reinforcing fibers and from 80 to 20 wt. % of the polymer matrix, based on the weight of the composite.

Exemplary embodiments will now be described in the following non-limiting examples.

Should the disclosure of any patents, patent applications, and publications which are incorporated herein by reference conflict with the description of the present application to the extent that it may render a term unclear, the present description shall take precedence.

Experimental Section

Raw Materials:

KETASPIRE® KT-820 P, aromatic polyetheretherketone (PEEK) polymer available from Solvay Specialty Polymers USA, LLC.—comparative polymer C Cypek® HT, aromatic polyetherketoneketones (PEKK) available from Solvay S.A.—comparative polymer D Arlon® 2000, aromatic polyetherketone (PEK) available from Greene, Tweede & Company, USA.—comparative polymer A PEKEKK ST-45P, aromatic polyetherketoneetherketoneketone available from Victrex—comparative polymer B 4,4'-Biphenol, polymer grade, was procured from SI, USA.

Pyrocatechol, flakes, was procured from Solvay USA. Its purity was 99.85% by GC. It contained 680 ppm moisture, which amount was used to adapt the charge weights. All weights indicated include moisture.

4,4'-Difluorobenzophenone, polymer grade (99.8%+), was procured from Malwa, India.

Diphenyl sulfone (polymer grade) was procured from Proviron (99.8% pure).

Sodium carbonate, light soda ash, was procured from Solvay S.A., France.

Potassium carbonate with a $d_{90}$<45 μm was procured from Armand products.

Lithium chloride (anhydrous grade) was procured from Acros.

Hydroquinone, photo grade, was procured from Eastman, USA. It contained 0.38 wt % moisture, which amount was used to adapt the charge weights. All weights indicated include moisture.

Methods

Determination of the Melting Temperature (Tm) and Heat of Fusion

The melting temperature (Tm) was determined as the peak temperature of the melting endotherm on the $2^{nd}$ heat scan in differential scanning calorimeter (DSC) according to ASTM D3418-03, E1356-03, E793-06, E794-06. Details of the procedure as used in this invention are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:

1st heat cycle: 30.00° C. to 450.00° C. at 20.00° C./min, isothermal at 450.00° C. for 1 min;
1st cool cycle: 400.00° C. to 30.00° C. at 20.00° C./min, isothermal for 1 min;
2nd heat cycle: 30.00° C. to 450.00° C. at 20.00° C./min, isothermal at 450.00° C. for 1 min.

The melting temperature (Tm) was determined as the peak temperature of the melting endotherm on the 2nd heat scan. The enthalpy of fusion was determined on the 2nd heat scan. The melting of the composition was taken as the area over a linear baseline drawn from 220° C. to a temperature above the last endotherm.

The glass transition temperature (Tg) (mid-point) was determined on the 2nd heat scan according to ASTM D3418-03, E1356-03, E793-06, E794-06.

Determination of the Melt Viscosity and Melt Stability (VR40)

The melt viscosity was measured using a capillary rheometer according to ASTM D3835. Readings were taken after 10-minute and 40-minute dwell time at 410° C. and a shear rate of 46.3 s−1 using a die with the following characteristics: diameter=1.016 mm, length=20.32 mm, cone angle=120°. The melt stability VR40 was measured by the ratio of the viscosity at 40 minutes over the viscosity at 10 minutes. The melt viscosity values indicated in the following tables were recorded at 10-minute dwell time.

Determination of Tensile Properties

A 102 mm×102 mm×3.2 mm plaque was prepared from the polymer by compression molding under conditions matching the melting temperature of the composition:

For examples 0 to 2, the molding conditions were:
preheat at 420° C.,
420° C./15 minutes, 2000 kgf
420° C./2 minutes, 2700 kgf
cool down to 320° C. over 20 minutes, 2000 kgf
50 minute-hold at 320° C., 2000 kgf
25 minute-cool down to 30° C., 2000 kgf.

The plaques were annealed under air at 275° C. for 3 hours, unless otherwise stated in the table below. The molding and annealing conditions were dictated by the melting temperature of the material and the need to develop the maximum level of crystallinity.

The temperatures of the steps 2, 3 and 5 were modified as follows:

TABLE 1

Compression molding conditions

| Example | T steps 2 & 3 (° C.) | T step 5 (° C.) | Annealing T (° C.) |
|---|---|---|---|
| 1(*) | 420 | 320 | 275 |
| 2(*) | 443 | 330 | 275 |
| 3 to 7 | 443 | 330 | 275 |
| B(*) | 427 | No intermediate step | 275 |
| A(*) | 400 | No intermediate step | None |
| C(*) | | | |
| D(*) | | | |
| 8 | 400 | No intermediate step | 275 |
| 9 and 10 | 400 | No intermediate step | 200 |

(*)comparative

The crystallinity level of the plaques was determined by DSC (one heat cycle, 20° C./min up to 450° C.), assuming 130 J/g for 100% crystalline material.

The compression molded plaques were machined into Type V ASTM tensile specimens and these specimens of the various polymer compositions were subjected to tensile testing according to ASTM method D638 at 0.05 inch/minute room temperature (i.e. 23° C.) on 3 specimens. The average of the 3 specimens is presented.

Also, rectangular test samples (1.2 cm×5.1 cm×0.32 cm) were prepared from these molded plaques and were dried at 120° C. under vacuum for 12 hours. Said test samples were then analyzed by Dynamic Mechanical Analysis (DMA) according to ASTM D 5279-13 on an TA ARES G2 rheometer under torsion mode (10 rad/s, 0.05% strain) from 30 to 330° C. at 5.0° C./min, in order to measure the storage modulus (G', Pa) at different temperatures, ranging from about 50° C. up to 310° C.

The data are presented in Tables below, show that the PEDEK-PEoEK with a PEDEK/PEoEK ratio of 60/40 to 85/15 exhibit a higher temperature capability than PEEK or PEDEK-PEoEK with lower than 60/40 PEDEK/PEoEK unit ratio.

Method for the Evaluation of Chemical Resistance of Compression Molded Samples

The 102 mm×102 mm×3.2 mm compression molded plaques of all the polymer compositions (prepared following the method detailed above and with the compositions in Table 2) were machined into Type V ASTM tensile specimens. These specimens were subjected to tensile testing according to ASTM method D638 at 0.05 inch/minute room temperature (i.e. 23° C.) on 3 specimens.

3 Type V tensile bars of each composition were exposed to a sweet salt water and hydrocarbon mixture in a 600 mL Inconel pressure vessel (154 mL heptanes+44 mL cyclohexane+22 mL toluene+36 mL aqueous solution 15 wt % KCl) at 300° C. for 7 days under nitrogen.

At the end of the exposure testing, the bars, were wiped and the weight after and before exposure were compared. Table 3 summarizes the weight gain, appearance of the bars and mechanical properties measured before and after exposure.

The retention of strength was calculated as follows:

% retention strength =

$$100 * \left( \frac{\text{strength at yield (or at break if no yield) after exposure}}{\text{strength at yield (or at break if no yield) before exposure}} \right).$$

Comparative Example 1: Preparation of PEDEK-PEEK Copolymer 60/40

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.70 g of diphenyl sulfone, 9.894 g of hydroquinone, 25.103 g of 4,4'biphenol and 50.130 g of 4,4'-difluorobenzophenone. The flask content was evacuated under vacuum and then filled with high purity nitrogen (containing less than 10 ppm 02). The reaction mixture was then placed under a constant nitrogen purge (60 mL/min).

The reaction mixture was heated slowly to 150° C. At 150° C., a mixture of 25.097 g of $Na_2CO_3$ and 0.155 g of $K_2CO_3$ was added via a powder dispenser to the reaction mixture over 30 minutes. At the end of the addition, the reaction mixture was heated to 320° C. at 1° C./minute. After 2 minutes at 320° C., 5.892 g of 4,4'-difluorobenzophenone were added to the reaction mixture while keeping a nitrogen purge on the reactor. After 5 minutes, 0.384 g of lithium chloride were added to the reaction mixture. 10 minutes later, another 1.964 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder. The repeat unit of the polymer was:

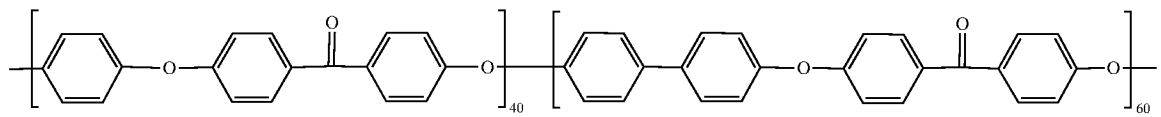

The melt viscosity measured by capillary rheology at 410° C., 46 s⁻¹ was 0.18 kN-s/m².

This example corresponds to Example 1 of WO 2018/086873.

Comparative Example 2: Preparation of PEDEK-PEEK Copolymer 75/25

The same procedure described in Comparative Example 1 above was followed, but using the following reagents and reaction conditions.

212.00 g of diphenyl sulfone, 4.226 g of hydroquinone, 21.442 g of 4,4'biphenol and 33.853 g of 4,4'-difluorobenzophenone.

At 150° C., a mixture of 16.812 g of Na2CO3 and 0.106 g of K2CO3 was added.

At the end of the addition, the reaction mixture was heated to 340° C. at 1° C./minute. After 7 minutes at 340° C., 3.928 g of 4,4'-difluorobenzo phenone were added to the reaction mixture while keeping a nitrogen purge on the reactor.

After 5 minutes, 0.651 g of lithium chloride were added to the reaction mixture. 10 minutes later, another 1.309 g of 4,4'-difluorobenzophenone were added to the reactor and the reaction mixture was kept at temperature for 15 minutes.

53 g of a white powder were obtained.

The repeat unit of the polymer was:

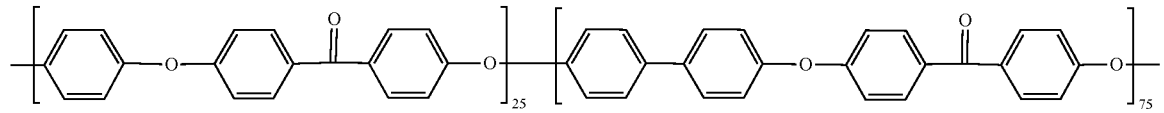

The melt viscosity measured by capillary rheology at 410° C., 46 s−1 was 8.75 kN-s/m2.

The polymer exhibited a chlorine content by microcoulometry of 0.7 µeq/g=25 wtppm Cl.

This example corresponds to Example 5 of WO 2018/086873.

Example 3: Preparation of PEDEK-PEoEK Copolymer 80/20

In a 1000 mL 4-neck reaction flask fitted with a stirrer, a N2 inlet tube, a Claisen adapter with a thermocouple plunging in the reaction medium, and a Dean-Stark trap with a condenser and a dry ice trap were introduced 445.22 g of diphenyl sulfone, 9.365 g of pyrocatechol, 63.321 g of 4,4'biphenol and 93.384 g of 4,4'-difluorobenzophenone. The flask content was evacuated under vacuum and then filled with high purity nitrogen (containing less than 10 ppm 02). The reaction mixture was then placed under a constant nitrogen purge (60 mL/min).

The reaction mixture was heated slowly to 150° C. At 150° C., a mixture of 46.487 g of Na₂CO₃ and 0.294 g of K₂CO₃ was added via a powder dispenser to the reaction mixture over 30 minutes. At the end of the addition, the reaction mixture was heated to 340° C. at 1° C./minute. After 22 minutes at 340° C., 11.128 g of 4,4'-difluorobenzophenone (1st termination) were added to the reaction mixture while keeping a nitrogen purge on the reactor. After 5 minutes, 1.812 g of lithium chloride (2nd termination) were added to the reaction mixture. 10 minutes later, another 1.855 g of 4,4'-difluorobenzophenone (3rd termination) were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture by successively washing the solid at room temperature with acetone (4 times 3600 mL), demineralized water (8 times with 3600 mL, with 30.00 g 37% HCl in the 3rd wash and 0.90 g NaH2PO4.2H2O and 0.90 g Na2HPO4 in 8th wash) and acetone (2 times 3600 mL at room temperature). The powder was then removed from the reactor and dried at 120° C. under vacuum for 12 hours yielding 139 g of a white powder.

The repeat unit of the polymer was:

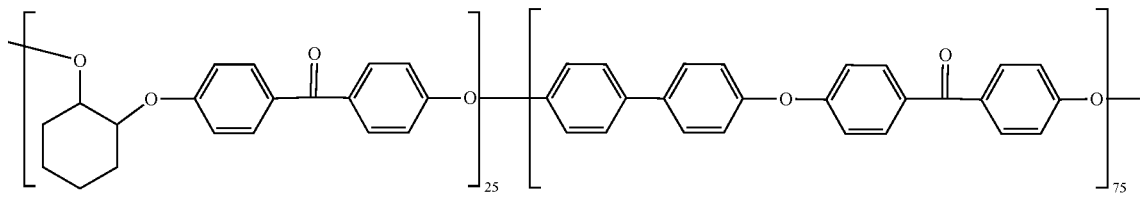

The polymer properties are summarized below.

Examples 4 to 7: Preparation of PEDEK-PEoEK Copolymer 80/20, 75/25, 70/30, 65/35

Comparative Examples 8 and 9: Preparation of PEDEK-PEoEK Copolymer 55/45 and 50/50

The polymers of Examples 4 to 7 and Comparative Examples 8 and 9 were prepared following the procedure detailed for Example 3, but using the reagents and amounts and final temperature of polymerization as detailed in the following Table 2.

washed 3 more times with 1 L acetone at room temperature for 30 minutes per cycle, then washed 3 times with 1000 mL demineralized water at room temperature (30-minute per cycle).

The powder was then dried at 120° C. under vacuum for 12 hours yielding 115 g of a white powder.

The properties of the resulting polymer are reported below.

The Tables provided herein below summarize the properties of the Polymers according to the present invention and of comparison, comparing polymers having similar Tg, i.e., having similar performance.

TABLE 2

| Reagent | Ex. 3 | Ex. 4 | Ex. 5 | Ex. 6 | Ex. 7 | CE8(*) | CE9(*) |
|---|---|---|---|---|---|---|---|
| Diphenyl sulfone (g) | 445.22 | 445.22 | 378.81 | 354.80 | 350.83 | 349.67 | 348.98 |
| Pyrocatechol (g) | 9.365 | 9.366 | 15.564 | 20.164 | 23.525 | 30.841 | 34.598 |
| 4,4'-biphenol (g) | 63.321 | 63.321 | 78.918 | 79.524 | 73.843 | 63.712 | 58.479 |
| 4,4'-difluorobenzophenone (g) | 93.384 | 93.384 | 124.93 | 134.03 | 134.03 | 136.670 | 137.989 |
| $Na_2CO_3$ (g) | 46.487 | 46.487 | 61.801 | 66.723 | 66.723 | 68.035 | 68.692 |
| $K_2CO_3$ (g) | 0.294 | 0.294 | 0.390 | 0.422 | 0.422 | 0.430 | 0.434 |
| Final polym temp (° C.) | 340 | 320 | 340 | 340 | 340 | 340 | 340 |
| Time at 320/340° C. (min) | 22 | 0 | 9 | 5 | 5 | 29 | 0 |
| 4,4'-difluorobenzophenone in $1^{st}$ termination (g) | 11.128 | 11.128 | 14.794 | 26.620 | 31.944 | 16.286 | 16.444 |
| Lithium chloride in $2^{nd}$ termination (g) | 1.812 | 1.812 | 2.409 | 2.601 | 2.601 | 2.652 | 2.678 |
| 4,4'-difluorobenzophenone in $3^{rd}$ termination (g) | 1.855 | 1.855 | 2.466 | 2.662 | 2.662 | 2.714 | 2.741 |
| Final polymer powder obtained (g) | 139 | 136 | 185 | 194 | 194 | 185 | 193 |

(*)comparative

Comparative Example 10: Preparation of PEDEK-PEoEK Copolymer 50/50 According to JP H1221426

The procedure described in JP H1221426 was replicated. In a 1000 mL 4-neck reaction flask fitted with a stirrer, a N2 inlet tube, a Claisen adapter with a thermocouple plunging in the reaction medium, and a Dean-Stark trap with a condenser and a dry ice trap were introduced 462.60 g of N-methylpyrrolidinone, 34.449 g of 4,4'-biphenol, 20.370 g of pyrocatechol, 81.549 g of 4,4'-difluorobenzophenone, 45.556 g of Na2CO3 and 15 mL of toluene. The flask content was evacuated under vacuum and then filled with high purity nitrogen (containing less than 10 ppm O2). The reaction mixture was then placed under a constant nitrogen purge (60 mL/min).

The reaction mixture was heated slowly to 200° C. over 50 minutes. The reaction mixture was held at 200° C. for 4 hours while toluene was refluxed to the reaction mixture. The reaction mixture was then cooled down to room temperature and coagulated with 1 L acetone in a Waring blender. The solid was filtered on a Büchner funnel and

TABLE 3

| | C2(*) PEDEK/ PEEK 75/25 | 3 PEDEK/ PEoEK 80/20 | 5 PEDEK/ PEoEK 75/25 |
|---|---|---|---|
| Tg(°c) | 173 | 171 | 164 |
| Tm(° C.) | 372 | 384 | 378 |
| ΔHf(J/g) | 33 | 78 | 67 |
| η at 410° C., 46 $sec^{-1}$ ($kN/m^2$) | 8.75 | 3.08 | 2.56 |
| VR40 (410° C.) | 0.90 | 1.05 | 1.01 |
| G' (GPa) at 140° C. | 1.38 | 1.34 | 1.44 |
| G' (GPa) at 165° C. | 1.13 | 0.86 | 0.60 |
| G'(165)/G'(140) % | 82 | 64 | 42 |
| Unexposed bars | | | |
| Tensile Elongation at Break (%) | 34 | 8.8 | 8.1 |
| Tensile Strength at Yield (psi) | 12100 | 13000 | 14200 |
| Tensile Strength at Break (psi) | 12000 | 12100 | 13100 |
| Tensile Elongation at Yield (%) | 6.2 | 5.3 | 4.4 |
| Tensile modulus (kpsi) | 449 | 550 | 556 |

TABLE 3-continued

|  | C2(*) PEDEK/ PEEK 75/25 | 3 PEDEK/ PEoEK 80/20 | 5 PEDEK/ PEoEK 75/25 |
|---|---|---|---|
| Exposed bars | | | |
| % retention strength | 82 | np | 77 |
| % retention elongation at break | 59 | np | 185 |
| % retention modulus | np | np | 95 |

(*)comparison;
np = not performed

TABLE 4

|  | 7 PEDEK/PEoEK 65/35 | C1(*) PEDEK/PEEK 60/40 | C8(*) PEDEK/PEoEK 55/45 | C9(*) PEDEK/PEoEK 50/50 | C10(*) PEDEK/PEoEK 50/50 |
|---|---|---|---|---|---|
| Tg(° C.) | 159 | 158 | 154 | 155 | 157 |
| Tm(° C.) | 360 | 365 | 334 | 329 | 346 |
| ΔHf(J/g) | 53 | 53 | 28 | 29 | 6 |
| η at 410° C., 46 sec$^{-1}$ (kN/m$^2$) | 1.55 | 0.18 | 0.79 | 1.70 | 11.4 |
| VR40 (410° C.) | 0.98 | 1.01 | 1.03 | 1.00 | 0.89 |
| G' (GPa) at 140° C. | 1.34 | 1.47 | 1.45 | 1.23 | 1.10 |
| G' (GPa) at 165° C. | 0.24 | 0.602 | 0.13 | 0.073 | 0.094 |
| G'(165)/G'(140) % | 18 | 41 | 9 | 6 | 9 |
| Unexposed bars | | | | | |
| Tensile Elongation at Break (%) | 6.9 | 4.5 | 4.8 | 8.3 | 60 |
| Tensile Strength at Yield (psi) | 13900 | 13400 | 12300 | 12800 | 11500 |
| Tensile Strength at Break (psi) | 12600 | 13200 | 11700 | 9900 | 9670 |
| Tensile Elongation at Yield (%) | 3.8 | 4.3 | 3.5 | 4.1 | 4.4 |
| Tensile modulus (kpsi) | 572 | 545 | 582 | 562 | 454 |
| Exposed bars | | | | | |
| % retention strength | 71 | 56 | np | np | np |
| % retention elongation at break | 135 | 33 | np | np | np |
| % retention modulus | 102 | np | np | np | np |

(*)comparison;
np = not performed

TABLE 5

|  | Polymer A(*) | Polymer B(*) | Polymer C(*) | Polymer D(*) | 4 PEDEK/PEoEK 80/20 | 6 PEDEK/PEoEK 70/30 |
|---|---|---|---|---|---|---|
| Tg(° C.) | 159 | 168 | 151 | 157 | 161 | 159 |
| Tm(° C.) | 373 | 383 | 336 | 359 | 396 | 360 |
| ΔHf(J/g) | 66 | 59 | 53 | 52 | 74 | 53 |
| η at 410° C., 46 sec$^{-1}$ (kN/m$^2$) | 0.31 | 0.39 | 1.25 | 0.93 | 1.06 | 1.55 |
| VR40 (410° C.) | 1.03 | 1.52 | 1.01 | 1.41 | 1.03 | 0.98 |
| G' (GPa) at 140° C. | 2.19 | np | 1.51 | 1.93 | 1.65 | 1.34 |
| G' (GPa) at 165° C. | 1.16 | np | 0.37 | 0.732 | 0.90 | 0.24 |
| G'(165)/G'(140) % | 53 | np | 25 | 38 | 55 | 29 |
| Unexposed bars | | | | | | |
| Tensile Elongation at Break (%) | 4.7 | 13 | 15 | 2.0 | np | 6.1 |
| Tensile Strength at Yield (psi) | np | 15700 | 13700 | np | np | 14200 |
| Tensile Strength at Break (psi) | 14300 | 14900 | 11800 | 11500 | np | 13300 |
| Tensile Elongation at Yield (%) | np | 5.8 | 5.0 | np | np | 3.9 |
| Tensile modulus (kpsi) | 633 | 620 | 540 | 643 | np | 608 |

TABLE 5-continued

|  | Polymer A(*) | Polymer B(*) | Polymer C(*) | Polymer D(*) | 4 PEDEK/PEoEK 80/20 | 6 PEDEK/PEoEK 70/30 |
|---|---|---|---|---|---|---|
| Exposed bars | | | | | | |
| % retention strength | 23 | 79 | 77 | 1.6 | np | 70 |
| % retention elongation at break | 9 | 58 | 113 | 13 | np | 148 |
| % retention modulus | np | 91 | np | np | np | 79 |

(*) comparison;
np = not performed

The above data showed that polymers (P) of the invention exhibited a higher temperature capability (Tg>153° C., and >15% retention of G' at 165° C. over 140° C.) than PEEK or PEDEK-PEoEK with a PEDEK/PEoEK unit ratio of below 60/40, notably PEDEK-PEoEK 50/50 made either in DPS or in NMP (representative of the prior art). As a consequence, polymers (P) of the invention were therefore well adapted to high temperature applications.

The above data showed that polymers (P) of the invention retained a good degree of crystallinity as shown by the value of the heat of fusion >40 J/g and exhibited a better melt stability than Comparative Polymer B(*) and D(*), which indicates they had an improved processability.

The above data showed that polymers (P) of the invention exhibited an improved chemical resistance at high temperature (higher % retention of strength and elongation at break) than comparative polymers; and an improved tensile strength over comparative polymers.

Overall, the polymers (P) of the invention characterized by the claimed unit ratio from 60/40 to 85/15 were found to exhibit a unique combination of high temperature capability, excellent chemical resistance and high melt stability.

The invention claimed is:

1. A polymer (polymer (P)) comprising:

from more than 60 to 85 mol. % based on 100 mol. % of said polymer (P) of recurring units ($R_{PEDEK}$) of formula (I):

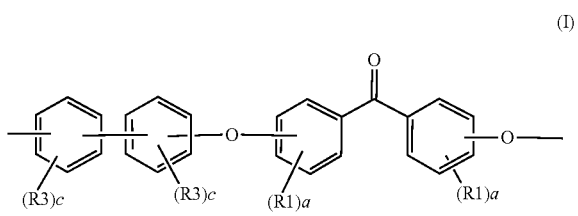

wherein each R1 is independently selected from Ci-C12 alkyl group optionally comprising one or more heteroatom(s), sulfonic acid and sulfonate groups, phosphonic acid and phosphonate groups, amine and quaternary ammonium groups, each R3 is independently halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium each a and each c is independently 0 or an integer from 1 to 4;

recurring units ($R_{PEoEK}$) of formula (II):

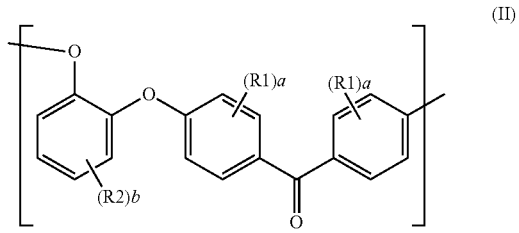

wherein each R1 is independently selected from Ci-C12 alkyl group optionally comprising one or more heteroatom(s), sulfonic acid and sulfonate groups, phosphonic acid and phosphonate groups, amine and quaternary ammonium groups; and each a is independently 0 or an integer from 1 to 4,each R2 is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, and each b is independently 0 or an integer from 1 to 4;

wherein the polymer (P) has a heat of fusion higher ($\Delta H$) higher than 40 J/g (determined according to ASTM D3418-03).

2. The polymer (P) according to claim 1, wherein said polymer (P) comprises:

from 61 mol. % of said recurring units ($R_{PEDEK}$) of formula (I), based on 100 mol. % of said polymer (P) and up to 85 mol. % of said recurring units ($R_{PEDEK}$) of formula (I), based on 100 mol. % of said polymer (P).

3. The polymer (P) according to claim 1, wherein said polymer (P) comprises:

from 15 to 40 mol. % of said recurring units ($R_{PEoEK}$) of formula (II), based on 100 mol. % of said polymer (P).

4. The polymer (P) according to claim 1, wherein:

in said recurring units ($R_{PEDEK}$) of formula (I), a and c are 0; and/or in said recurring units ($R_{PEoEK}$) of formula (II), a and b are 0.

5. A method for the synthesis of polymer (P) according to claim 1, said method comprising:
(a) contacting at least one compound of formula (III)

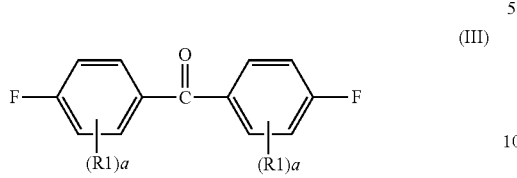

wherein
each R1 is independently selected from $C_1$-C12 alkyl group optionally comprising one or more heteroatom(s), sulfonic acid and sulfonate groups, phosphonic acid and phosphonate groups, amine and quaternary ammonium groups; and each a is independently 0 or an integer from 1 to 4,
with a mixture of compounds of formula (IV) and (V):

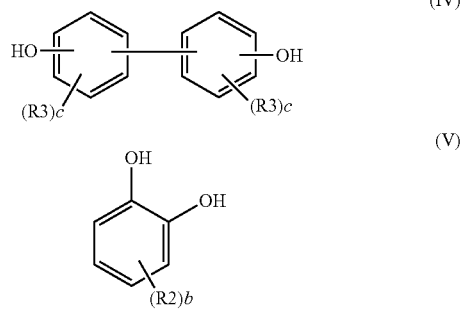

wherein each R2 is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; each R3 is independently halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; each b and each c is independently 0 or an integer from 1 to 4,
such that the ratio of (IV) and (V) is from 85/15 to 60/40;
in the presence of a base (base (B)) and in a polar organic solvent (solvent(S)), so as to obtain a reaction mixture;
(b) optionally, terminating the reaction in step (a) by contacting said reaction mixture with a suitable agent, so as to obtain a product mixture; and
(c) recovering said polymer (P) from said reaction mixture or from said product mixture.

6. The method according to claim 5, wherein said step (a) is performed:
in the presence of base (B) selected from $Na_2CO_3$, $K_2CO_3$, or a combination thereof; and/or
in a solvent(S) comprising diphenyl sulfone; and/or
at a temperature of at least 130° C. for about 0.5 to 15 hours.

7. The method according to claim 5, wherein:
in formula (III), a is 0 and said compound is 4,4'-difluorobenzophenone (DFBP); and/or
in formula (IV), c is 0 and said compound is 4,4'-dihydroxybiphenyl;
in formula (V), b is 0 and said compound is catechol.

8. The method according to claim 5, wherein said step (b) is performed in the presence of at least one end-capping agent.

9. The method according to claim 8, wherein the at least one end-capping agent complies with the following formula (F):

wherein
$R^6$ is F, Cl, or OH,
$R^7$ is —C(O)—Ar—$R^{10}$, —O—Ar—$R^{10}$, —$SO_2$—Ar—$R^{10}$, —Ar—$R^{10}$, an alkyl or —H, with Ar being an arylene group
comprising at least one benzene ring, and with $R^{10}$ being F, Cl or H.

10. A composition (composition (C)) comprising polymer (P) as defined in claim 1 and at least one additional ingredient (ingredient (in)).

11. The composition (C) according to claim 10, wherein said ingredient (in) is selected from the group consisting of (i) reinforcing fillers; (ii) colorants; (iii) pigments; (iv) light stabilizers; (v) heat stabilizers; (vi) antioxidants; (vii) acid scavengers; (viii) processing aids; (ix) nucleating agents; (x) internal lubricants and/or external lubricants; (xi) flame retardants; (xii) smoke-suppressing agents; (xiii) anti-static agents; (xiv) anti-blocking agents; (xv) conductivity additives; (xvi) plasticizers; (xvii) flow modifiers; (xviii) extenders; and (xix) metal deactivators.

12. The composition (C) according to claim 11, wherein said composition (C) comprises less than 80 wt. % and at least 10 wt. % of said reinforcing filler, based on the total weight of the composition (C).

13. The composition (C) according to claim 11, wherein said at least one nucleating agent is selected from talc or boron nitride.

14. A shaped article comprising: the polymer (P) as defined in claim 1 and/or a composition (C) comprising the polymer (P) and at least one additional ingredient, ingredient (in).

15. The shaped article according to claim 14, said article being an article for oil and gas recovery, for automotive, for aerospace, for electronics, for semi-conductor industry, for industrial or consumer applications.

16. A method of making at least one part included in a shaped article as defined in claim 13, including at least one step of moulding, extruding or coating said polymer (P) and/or said composition (C), to make said at least one part.

17. The polymer (P) according to claim 1, wherein said polymer (P) comprises:
from 62 mol. % of said recurring units ($R_{PEDEK}$) of formula (I), based on 100 mol. % of said polymer (P) and up to 84 mol. % of said recurring units ($R_{PEDEK}$) of formula (I), based on 100 mol. % of said polymer (P).

18. The polymer (P) according to claim 1, wherein said polymer (P) comprises from 15 to 39 mol. % of said recurring units ($R_{PEoEK}$) of formula (II), based on 100 mol. % of said polymer (P).

19. The polymer (P) according to claim 1, wherein said polymer (P) has:
   (i) a glass transition temperature (Tg) higher than 153° C. (measured according to ASTM D3418-03); and
   (ii) a ratio of the storage modulus measured at 165° C. to the storage modulus measured at 140° C. higher than 15% (measured according to ADTM D5279-13).

20. The polymer (P) according to claim 1, wherein said polymer (P) has
   a melt viscosity in the range from 0.20 to 9.00 KN/m2 (measured according to ASTM D3835).

* * * * *